(12) United States Patent
Thomas et al.

(10) Patent No.: US 10,262,325 B2
(45) Date of Patent: Apr. 16, 2019

(54) METHODS AND SYSTEMS FOR MOBILE FLEET CARD ACTIVATION

(71) Applicant: WEX, Inc., South Portland, ME (US)

(72) Inventors: John Lind Thomas, South Freeport, ME (US); Philip S. Baker, Cape Elizabeth, ME (US); Maninder Singh, Bangalore (IN)

(73) Assignee: WEX Inc., South Portland, ME (US)

( * ) Notice: Subject to any disclaimer, the term of this patent is extended or adjusted under 35 U.S.C. 154(b) by 323 days.

(21) Appl. No.: 15/142,752

(22) Filed: Apr. 29, 2016

(65) Prior Publication Data

US 2016/0321665 A1 Nov. 3, 2016

Related U.S. Application Data

(60) Provisional application No. 62/154,576, filed on Apr. 29, 2015.

(51) Int. Cl.
| | |
|---|---|
| *G06Q 20/40* | (2012.01) |
| *G06Q 20/32* | (2012.01) |
| *G06Q 20/34* | (2012.01) |
| *G07F 15/00* | (2006.01) |
| *G06Q 20/20* | (2012.01) |

(52) U.S. Cl.
CPC .......... *G06Q 20/409* (2013.01); *G06Q 20/20* (2013.01); *G06Q 20/204* (2013.01); *G06Q 20/3226* (2013.01); *G06Q 20/354* (2013.01); *G07F 15/001* (2013.01)

(58) Field of Classification Search
USPC ......................................................... 705/17
See application file for complete search history.

(56) References Cited

U.S. PATENT DOCUMENTS

| | | | |
|---|---|---|---|
| 4,469,149 A | 9/1984 | Walkey et al. | |
| 5,204,819 A * | 4/1993 | Ryan | B67D 7/08 340/5.9 |
| 5,359,522 A * | 10/1994 | Ryan | B67D 7/08 235/382 |
| 7,729,998 B2 | 6/2010 | Dickman | |
| 8,292,171 B2 | 10/2012 | Granruth et al. | |
| 8,965,790 B2 | 2/2015 | Grigg et al. | |

(Continued)

FOREIGN PATENT DOCUMENTS

| | | |
|---|---|---|
| CN | 202475490 U | 10/2012 |
| EP | 0955612 A1 | 11/1999 |

(Continued)

*Primary Examiner* — Garcia Ade
(74) *Attorney, Agent, or Firm* — Pierce Atwood LLP; Kevin M. Farrell

(57) ABSTRACT

Disclosed are fleet mobile payment methods and systems. In an embodiment, a plurality of vehicle cards are assigned to a plurality of vehicles associated with the company, each of the plurality of vehicle cards being assigned to one vehicle. The states of the vehicle cards are initially set to suspended status. A virtual token is sent from an activation server to a mobile device corresponding to a user of the mobile device. The vehicle card may be activated by receipt of the virtual token, together with vehicle identification, by the activation server. Additional authentication may be required to complete the transaction. In preferred embodiments, the vehicle cards revert to suspended status following each authorized use.

20 Claims, 3 Drawing Sheets

(56) References Cited

U.S. PATENT DOCUMENTS

| | | |
|---|---|---|
| 2004/0030601 A1 | 2/2004 | Pond et al. |
| 2006/0012479 A1 | 1/2006 | Ezra |
| 2009/0089214 A1 | 4/2009 | Weston et al. |
| 2010/0332363 A1 | 12/2010 | Duddle et al. |
| 2011/0172816 A1 | 7/2011 | Ezra |
| 2013/0206279 A1* | 8/2013 | Ryan .................. B67D 7/145 141/94 |
| 2014/0289115 A1 | 9/2014 | Basile et al. |
| 2014/0351138 A1 | 11/2014 | Frieden et al. |
| 2015/0032558 A1* | 1/2015 | Bonk .................. G06Q 20/202 705/21 |

FOREIGN PATENT DOCUMENTS

| | | |
|---|---|---|
| GB | 2494913 A | 3/2013 |
| KR | 20120079984 A | 7/2012 |
| NL | 1006642 C2 | 1/1999 |
| WO | 03104135 A1 | 12/2003 |
| WO | 2013132449 A1 | 9/2013 |

* cited by examiner

METHODS AND SYSTEMS FOR MOBILE FLEET CARD ACTIVATION

TECHNICAL FIELD

The present disclosure relates in general to fleet card payments and in particular to utilizing mobile technology for authorizing and organizing payments via fleet cards.

BACKGROUND

A fleet card program is often set up for managing payments, e.g. fuel payments, for vehicles in a fleet that a company owns. The program may assign one or more fleet accounts to each company that it services. For each company, the program may issue a fleet card to each vehicle in that company's fleet. The fleet card for each vehicle is kept in the same vehicle, which may be driven by different drivers at different times.

A driver of the vehicle may present the fleet card of the vehicle to pay, e.g., for the fuel at a point of sale (POS), e.g., a gas pump. In response, the POS may prompt the driver to enter some required information; information such as the driver's identification and the odometer reading of the vehicle.

The POS may send this information along with an authorization request to an authorization server of the fleet card program. The authorization server may be in charge of managing the use of the fleet cards. The authorization may require a mechanism to verify the authenticity of the payment requested by the POS. The authorization may, for example, require verification that the request comes from an authorized driver of the vehicle or that the request is consistent with an authorized usage of the vehicle. The verification may involve checking that the vehicle is not being used by an unauthorized driver, or that it has not been driven to locations or distances that are not consistent with the scheduled route of the vehicle.

The authorization server may be required to complete the authorization with the minimum interruption in the authorization process, within a specified duration of time, or with a minimum required interactions with the driver or POS.

The methods and systems disclosed herein, particularly the Mobile Payment Gateway Enabler (MPGE) system, provide an improvement over existing fleet card systems by applying advanced authentication server technology to enable more efficient, rapid, accurate, and secure fleet card payment processing.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings.

DETAILED DESCRIPTION

Figure 1:
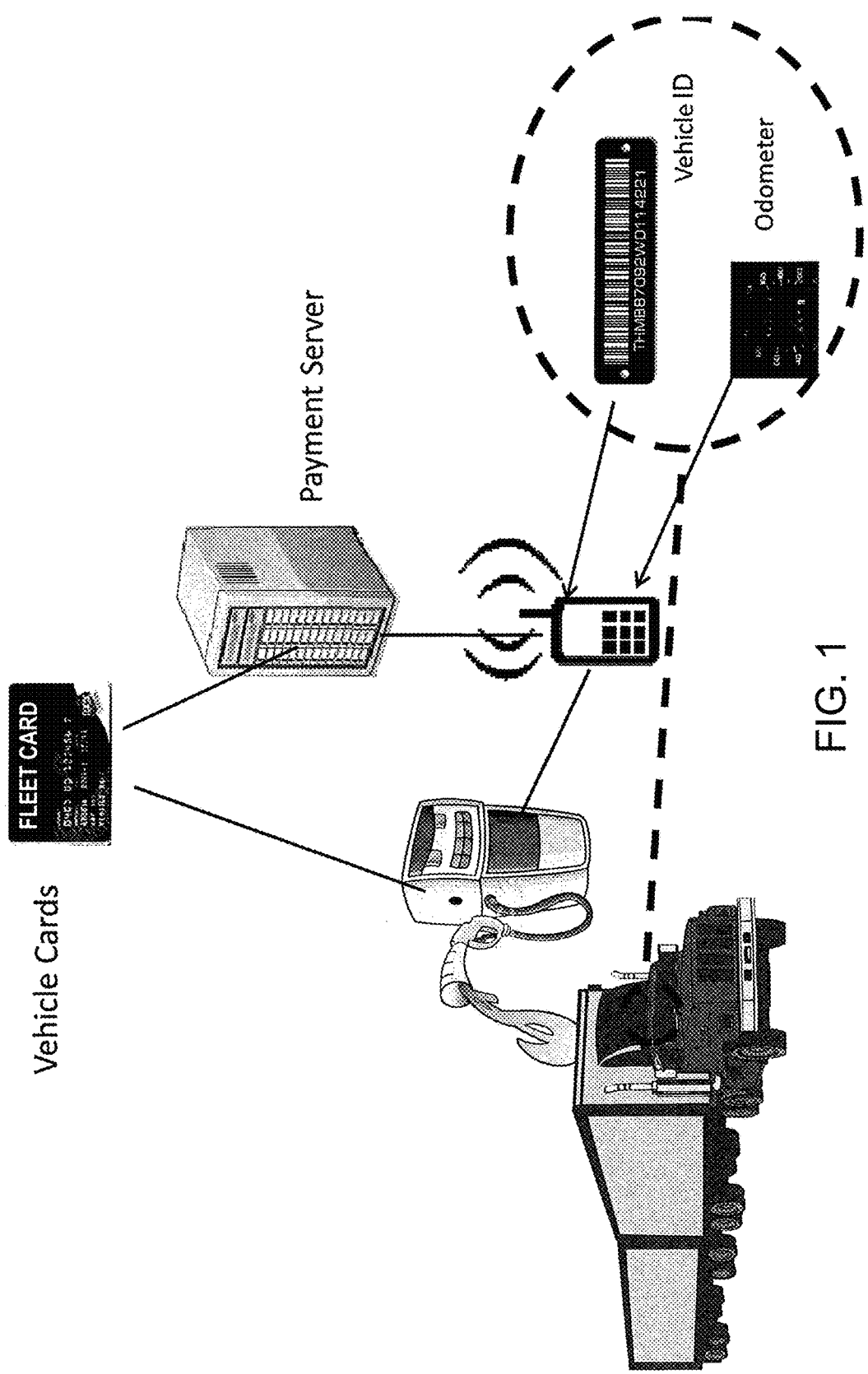
FIG. 1 illustrates a Mobile Payment Gateway Enabler (MPGE) system according to some embodiments.

The following detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

Some embodiments involve use of an authorization system in a fleet card payment program. In some embodiments, the authorization system includes a mechanism that frequently suspends and activates the fleet cards as detailed below. Moreover, some embodiments utilize a mobile system that uses a different mechanism than the existing fleet card mechanisms. The mobile method simplifies and improves the traditional fleet card systems. The mobile system may use mobile devices used by drivers in the fleet program.

Some embodiments provide systems and methods that change the existing traditional process used for fleet cards, and enable a process with less interruptions or interactions between an authorization server and the driver or the POS. To achieve such goals, however, the embodiments cannot rely on solutions used for consumer credit cards, because a fleet card program differs from a consumer credit card program.

For example, a consumer credit card is issued to an individual, while a fleet card is issued to a vehicle. Authorizing a consumer credit card payment may only require verifying authenticity of the user. Such verifications, however, may not be possible or sufficient for fleet cards, because a user's fleet card may be used by any of many different drivers that drive the vehicle at different times. The fleet card may stay with (remains tied to) the user's vehicle, not the driver.

Authorizing a purchase via a fleet card therefore may use a different mechanism compared to a consumer credit card. In the case of the fleet card, the authorization server may be required to verify that the received information is consistent with expected values for the information. That is, the authorization server may verify that driver ID corresponds to a driver who is authorized to drive the vehicle at that time, or verify that the odometer reading or location of the vehicle is consistent with an expected location of the vehicle and expected distance that the vehicle has been driven since its last refueling. If verified, the authorization server may authorize the payment and send the authorization to the POS.

Some embodiments further provide a mobile payment system for use of fleet cards. Like in the case of the physical fleet card, a mobile fleet card system also differs from a mobile payment system for consumer credit cards. In the latter case, when a user utilizes a mobile payment system, the user may be required to register the user's consumer credit card into his/her profile in a mobile device, which may be called a mobile wallet. Afterwards, when paying at a particular merchant, the consumer can select the credit card from among one or more registered cards in the user's mobile wallet. Such a system, however, cannot be used for fleet cards, when an individual driver drives a vehicle: It may not be feasible for the driver to "register" all possible fleet cards into the driver's mobile wallet, because there may be many such cards used by the same fleet. Even if it were feasible, the driver would not have any reasonable basis for knowing which card he/she should use for any given transaction.

To address these issues, some embodiments provide Mobile Payment Gateway Enabler (MPGE) systems and methods.

FIG. 1 illustrates an MPGE system according to some embodiments. The MPGE system includes one or more fleet vehicles, one or more mobile devices used by the drivers of the fleet vehicles, a payment server, one or more fleet cards, aka vehicle cards, assigned to the fleet vehicles, and one or more POSs. The payment server may include one or more activation servers (aka activation cloud) and one or more card service servers (aka card issuer or backend system). The activation server may interact with the mobile device and the card service server to activate or suspend the fleet cards at different times. The activation server may use web service API calls to activate or suspend the fleet cards.

The mobile device may be a mobile computer, a tablet, a smartphone, an embedded in-vehicle computer, etc. Some embodiments further use various capabilities provided on the mobile device, such as location services.

In some embodiments, the mobile device interacts with different parts of the system via a mobile application (aka mobile app or app). Each user may be required to install the app on the user's mobile device. The app may provide interfaces for interacting with the user, mechanisms for capturing the vehicle identification, odometer reading, fuel level, or other information. The app may further provide systems for interacting with the activation server or the POS.

The fleet card may be a virtual fleet card, that is, corresponding to the identification of a fleet card issued by the fleet program and for which the records are stored in the backend. The fleet program may not require issuing a corresponding physical fleet card for the system to work. Alternatively, the fleet card may also include a physical card, e.g., made of plastic, located in the vehicle and tied to the corresponding virtual fleet card record.

These and other details of the MPGE system will be explained below.

To identify one or more fleet cards that the user, e.g., a driver, can use, the activation server may issue a virtual token to the user. The activation server may send the virtual token to the user's mobile device through, e.g., the mobile app. The mobile device may store and use the virtual token for use. In some embodiments, the virtual token identifies the driver. In some embodiments, the virtual token further identifies a fleet account the user is authorized to use. The fleet account may be a fleet account of the company for which the user works. A user may be authorized to use more than one fleet account assigned to the same or different companies. In some embodiments, the user receives a separate virtual token for each fleet account that the user is authorized to use. The user may not need, however, to receive separate virtual tokens for each fleet card that the user is authorized to use.

The virtual token may include in a string, an encrypted string, or an encrypted message. The virtual token may, for example, include an identification corresponding to the user and another identification corresponding to the fleet account. In some embodiments, the MPGE system requires both user identification information and fleet account identification information to identify a fleet card. In some other embodiments, the MPGE system can use one of the two sources of identification information (i.e., user or fleet account) to identify the fleet card. The identifications may identify record numbers in a database stored in the backend. The virtual token may be exchanged via a secured channel between the mobile device and the activation server, using additional encryptions or other types of secured transactions.

In some embodiments, the mobile device uses the virtual token as a virtual card for making purchases for a vehicle. In some embodiments, a user may use a fleet virtual wallet to register a virtual token that the user's mobile device receives. The fleet virtual wallet may be part of the MPGE mobile app. The virtual wallet therefore initially registers a payment tender (e.g., a virtual token) with the wallet. In some embodiments, the user may utilize the virtual token in a manner similar to using a consumer credit card. The enabling mechanism for using the card, however, is different from the consumer credit cards. For example, the virtual token may not be generally tied to any specific fleet card. Instead, the virtual token may be tied to different fleet cards at different times. In particular, at any time, the virtual token may be tied to the fleet card of the vehicle that the token owner is driving at that time. The virtual token may be used to activate that fleet card at that time and use that fleet card for purchases, as detailed below.

In some embodiments, the system maintains a fleet card in a suspended state as its default state. In a suspended state, the fleet card cannot be used for purchases. A user, such as a driver, may be required to activate the fleet card before the driver intends to use the fleet card. The driver may do so when starting to drive the vehicle, before the first refueling, or frequently during use of the vehicle. The driver may do so by interacting with the user's mobile app. The mobile app may interact with the activation server to identify the corresponding fleet card, authorize the user's upcoming use, and then activate the fleet card. By suspending the fleet card when the corresponding vehicle is not in use the risk of unauthorized fleet card use is reduced. Existing fleet card technology cannot suspend and activate fleet cards efficiently because they lack the communications and data entry capabilities of the MPGE system.

In some embodiments, the virtual token, when combined with the vehicle ID, allows the activation server to identify the appropriate fleet card to utilize for the transaction, without requiring the driver to register all of the possible cards his/her fleet makes available as potential payment options. The activation server may identify the fleet card by identifying the fleet account and the user in its database, and finding the fleet card that is issued under the fleet account for the vehicle.

The payment server may further verify that the user is authorized to use the fleet card, or to use the vehicle at that time. The verification may require checking the driver's schedule or the schedule of the vehicle against the fleet company's records.

Regarding the vehicle ID, in some embodiments a driver may capture this ID by scanning via the mobile device a QR code or an RFID (NFC) tag within the vehicle. In cases where fleet vehicles are outfitted with telematics capabilities, the MPGE system may query the telematics system to identify the vehicle saving time and improving security and reporting. Alternatively, or additionally, a driver may enter the vehicle ID by reading it off a location in the vehicle and entering it in a corresponding MPGE interface on the MPGE app. In various embodiments, the vehicle ID may be the VIN of the vehicle, or a record number that corresponds to the vehicles record in the payment server's database.

If the payment server identifies the fleet card and determines that the user is authorized to use the fleet card, the activation server may then activate the status of the fleet card from a suspended or deactivated state to an active state. Doing so will allow the user to use the fleet card in the fleet virtual wallet for making a purchase at a POS.

At the time of purchase, the user may present the POS with the fleet card, or with virtual token in the fleet virtual wallet. The fleet card may be a physical card that the driver swipes or taps at the POS. Alternatively, the user may present the virtual token using the mobile app at the POS. The POS may send the received information along with an authorization request to the payment server. In the case of virtual token, the payment server may identify the fleet card associated with the virtual token at that time. The payment server may further check that the fleet card is active and, if so, authorize the sale. The payment server may otherwise decline authorization.

In some embodiments, the payment server may deactivate (place back in a suspended state) an active fleet card after some deactivation trigger event occurs. The deactivation trigger event may be one or a combination of authorizing a specific number (e.g., one, two, etc.) of sales after the last activations, passage of some duration of time after the last activation, completion of a scheduled route by the vehicle, completion of driver's scheduled driving of the vehicle, entry of the vehicle in a specific region, distancing of the vehicle from its scheduled route, etc. In order to reuse a deactivated fleet card, the user is then required to activate the fleet card.

Figure 2:
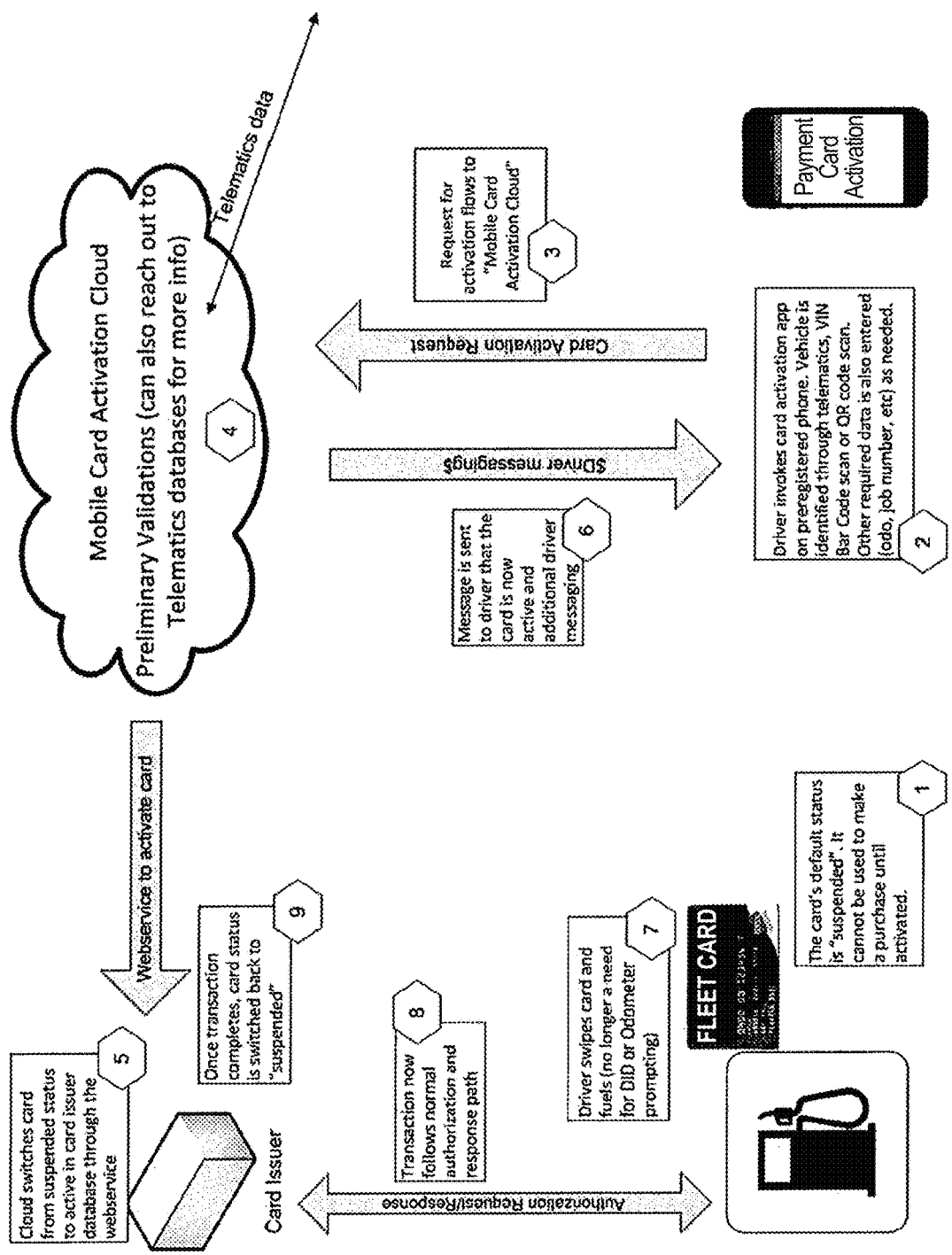
FIG. 2 shows a block diagram for an MPGE system and the corresponding process according to some embodiments.

FIG. 2 shows a block diagram for an MPGE system and the corresponding process according to some other embodiments. In FIG. 2, the MPGE system includes a mobile device on which the mobile app is installed, an activation server (labeled Mobile Card Activation Cloud), a card service center or backend (aka card server, labeled Card Issuer), a POS (shown as a gas pump), and a fleet card. In some embodiments, the back end includes an authorization server and one or more databases that store, among other things, information related to the fleet accounts and fleet cards.

FIG. 2 further shows the interactions between these sections for activating and deactivating the fleet card. In some embodiments, some of the sections provide an API for other sections to interact with them. The activation server may, for example, interact with the back end via a card server API. Similarly, the mobile device may interact with the activation server via an activation server API.

In some embodiments, when utilizing the payment tender within a fleet wallet, at the time of transaction the wallet may provide to the activation server the virtual token, as well as the vehicle ID. With this information the activation server may determine the fleet card that is tied to the particular vehicle, and select that card for authorization (or decline the transaction).

Some embodiments disclose a payment system that collects information that includes information about a company employee who intends to make a payment via a fleet card. Based on the received information, the system decides whether to enable the payment. The enablement may include activating an account for subsequent and immediate use of a charge card, or another embodiment of the charge card, such as a mobile phone, chip, or magnetic stripe.

In some embodiments, a user registers in an activation system. The registration may include claiming an account, i.e., a token, set up by the program administrator. In some embodiments, the token uniquely identifies the user. Different users, therefore, may receive different tokens. The token may further uniquely identify a fleet account, of one or more fleet accounts that the user is authorized to use.

In some embodiments, a user may use the system to activate a vehicle card that is in a suspended state. In particular, a user may be using a vehicle for which the vehicle card is suspended, such that it cannot be used for purchases without prior activation. A user may, for example, attempt to activate the vehicle card in anticipation of an upcoming purchase. In some embodiment, a user may use the system to authorize a specific purchase at a point of sale, e.g., at a gas station.

To initiate activation of a card or authorization of a purchase, the user may utilize an application on the mobile device (also known as a mobile app or app). The user may enter certain information to the app. The information may vary depending on the account setup they have associated to their profile.

In the case of a fueling transaction for a vehicle, the driver may identify the vehicle they are driving by entering a vehicle identification (id). In some embodiments, the vehicle id may be automatically derived via utilization of installed vehicle telematics devices and associated APIs. In some embodiments, the driver may enter a vehicle id associated with their account via a mobile app user interface. In some embodiments, the driver may scan a QR code or RFID tag with the vehicle identification embedded within it that has been placed in the vehicle.

In some embodiments, an activation server of the system receives information from the mobile device, including, for example, the driver's virtual token and the vehicle identification. The system may make a call to backend services, via the networks available, to ascertain if there are additional data that are required to be collected for the transaction. The additional information may, for example, include an odometer reading of the vehicle, a fuel gauge reading of the vehicle, or additional identification verification information about the user or the vehicle. The driver may then be prompted to enter the additional information. In some embodiments, part or all of the additional information may be automatically collected. The system may, for example, connect to a telematics device to retrieve the vehicle's current odometer reading or fuel gauge reading. Some of this information may be optional, such that missing that information does not fail the process. Optional information may, for example, include date and time, additional information about the driver, location of the vehicle, etc. Once all required and optional data is collected, the system may send the data to a backend system for storage and tracking.

Next, in some embodiments, the system may determine the actual primary account number (PAN) to utilize for the payment. The PAN may correspond to a fleet account. In some embodiments, the system further identifies a vehicle card associated with the vehicle and the fleet account for the vehicle. The vehicle card may be a virtual or a physical card.

In some embodiments, the system may activate a suspended card. In particular, the vehicle card may be in a suspended state, in which it cannot be used for purchases. The activation system may activate the card after verifying the information and deciding that the user is authorized to use the vehicle card for a purchase.

In some embodiments, to authorize a purchase, the system may request an authorization for a purchase against the PAN, or it will send the PAN back to the Point of Sale or its intermediary. In some embodiments, if card activation is performed and the card is a physical card, the user may be expected to use the card with the associated PAN to execute the transaction with the POS. This state may include some communication between the card and a device at the POS. The communication may include a mechanism such as tapping the card if it is an NFC-based card, or swiping the card if it is a magnetic stripe card, etc. The card may have been pre-programmed to not request any prompting of the POS, or very limited prompting, as all such data may have already been collected on the mobile app.

Once the transaction has been executed through one of the methods described, if necessary, the data collected via the mobile phone may be combined with data that are collected by the POS about the financial transaction. This data may then be made available to the account administrator and other users for further analysis or recording of the transaction.

Some embodiments provide a use of the MPGE to translate the token-vehicle id combination to a card for use in subsequent transactions. In this case, the physical fleet card is used for a vehicle, but the card is initially in a suspended resting state. The card resides in the vehicle. A driver can temporarily activate the card by using the driver's mobile app installed on the driver's mobile device, e.g., by providing identification information to the MPGE system. In some embodiments, the card is suspended after each use, after a set number of uses, or after a preset time.

In this case the physical card still resides in the vehicle and is necessary, but this capability offers the additional security features. The system further allows that some or all of the data that are otherwise captured via prompting at the POS be instead captured via the mobile phone and directly communicated to the activation server. This function allows for immediate use at MPGE enabled merchant, without requiring additional mobile payment integrations.

Figure 3:
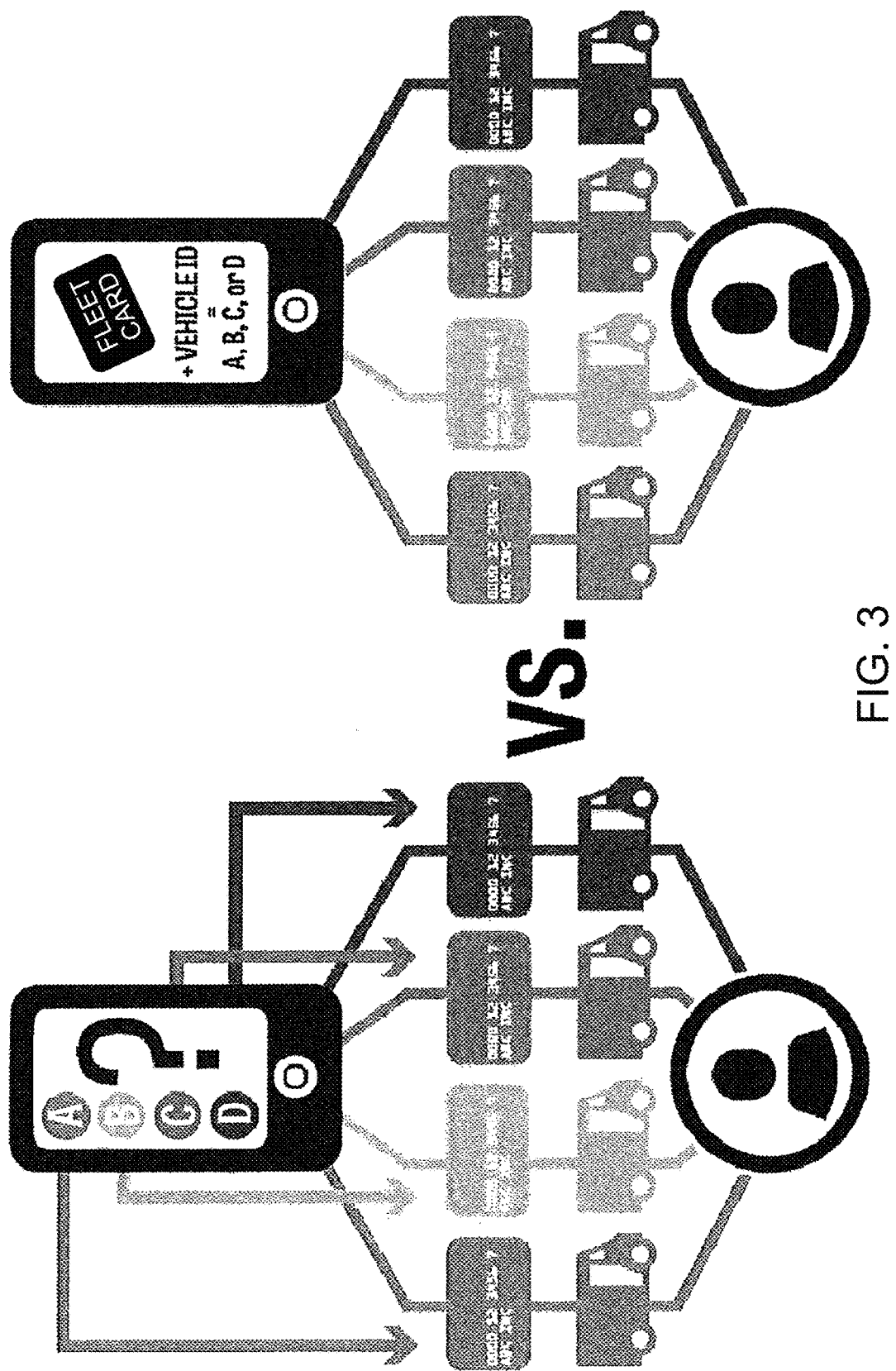
FIG. 3 illustrates the differences between some traditional uses of physical fleet cards and the new system used by the embodiments.

FIG. 3 illustrates the differences between some traditional uses of physical fleet cards and the new system used by the embodiments. In particular, the left half shows that in the traditional systems, the user is often required to enter information, either at the POS or elsewhere, to identify the vehicle's fleet card, or to physically present the fleet card. The user may also be required to enter other information at the POS to enable authorization. This information may include the vehicle's identification, the user's identification, some password for the card, odometer reading, etc. In the new system shown on the right, on the other hand, the system does not require entry of this information at the POS. Instead, the activation server identifies the fleet card and activates it either in advance or at the POS using the above-discussed mechanism. The new system, enabled by the specific authorization server technology described herein, is more secure and efficient for the user and driver.

The following lists some of the features of different embodiments.

In some embodiments, the data collected on the app are updated in the backend system.

In some embodiments, prompts are sent to the mobile device based on the card being activated.

In some embodiments, the app is to add any card type based on the user's usage history.

In some embodiments, the driver can see the driver info on the app after login.

In some embodiments, the user is able to differentiate between the cards added to the app on a My Cards page of the mobile app.

In some embodiments, the user is able to login to the mobile app using the credentials created during registration.

In some embodiments, the user is able to register in the app and create login credentials for future access.

In some embodiments, the user is able to see a loading indicator during system processing (all action buttons).

In some embodiments, the user sees an error message when losing internet or unable to connect with mobile activator service In some embodiments, the user enters Vehicle ID & Odometer prompts before activating the card In some embodiments, the user is able to Remove a card from the fleet virtual wallet.

In some embodiments, the user is able to Cancel the Add Card operation.

In some embodiments, the user can always see the status for all of the user's cards when needed.

In some embodiments, the user can know how much time is left before the user's active card gets suspended.

In some embodiments, the system suspends the active card after a few minutes, e.g., 10 minutes from the activation time. The user, thus may need to activate a card in less than 10 minutes before a use.

In some embodiments, the user can manually deactivate the active card in the app.

In some embodiments, the user is able to activate the card(s) added to the Mobile app.

In some embodiments, the user is able to see all of the cards that the user has added to the Mobile app.

In some embodiments, when the user submits info on the Add Card form (the form for adding a card to the fleet virtual wallet), the system confirms whether the card is active or displays an error message.

In some embodiments, the user is able to add a card to the virtual fleet wallet.

Each of the systems described above may comprise one or more modules. The modules may be implemented individually or their functions may be combined with the functions of other modules. Further, each of the modules may be implemented on individual components, or the modules may be implemented as a combination of components. For example, each of the modules may be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, a mobile device, or any other combination of devices or modules capable of performing the tasks of the corresponding module. In some embodiments, one or more of the disclosed methods are stored in the form of programs on one or more non-transitory computer readable mediums. A computer readable medium can be a data storage module. A data storage module may comprise a random access memory (RAM), a read only memory (ROM), a programmable read-only memory (PROM), a field programmable read-only memory (FPROM), or other dynamic storage device for storing information and instructions to be used by another module, such as a data processing module or a search module. A data storage module may also include a database, one or more computer files in a directory structure, or any other appropriate data storage mechanism such as a memory.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a,"

"the," "one," "one or more," "some," or "various" embodiments. Instead, the proper scope of the embodiments is defined by the appended claims. Further, stating that a feature may exist indicates that the feature exists in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or" is often used not exclusively, but inclusively to mean and/or.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A fleet mobile payment method, the method comprising:
    assigning a fleet account to a company;
    assigning a vehicle card to a vehicle associated with the company for paying from the fleet account for sales made for the vehicle;
    setting a state of the vehicle card to a suspended state, wherein in the suspended state the vehicle card cannot be used for payments;
    receiving, from a mobile device, information that includes:
        a virtual token corresponding to a user of the vehicle, wherein the virtual token includes an identification of the user; and
        a vehicle identification corresponding to the vehicle;
    identifying, based on the information, the vehicle card;
    activating the vehicle card by changing, based on the information, the state of the vehicle card from the suspended state to an active state, wherein in the active state the vehicle card can be used for payments from the fleet account;
    receiving, from a point of sale, sale information requesting authorization of a sale to be performed via the vehicle card; and
    authorizing payment for the sale via the vehicle card.

2. The method of claim 1, wherein:
    the information further comprises an odometer reading of the vehicle.

3. The method of claim 1, wherein:
    the vehicle card is a physical vehicle card placed in the vehicle; and
    the user presents the vehicle card at the point of sale for performing the sale.

4. The method of claim 1, wherein the information further includes one or more of an identification of a job on which the user is working, an identification information about the user, a password, a time indication, and a location indication.

5. The method of claim 1, further comprising:
    deactivating the active vehicle card by changing the state from the active state to the suspended state.

6. The method of claim 5, wherein the deactivating occurs upon occurrence of a deactivation trigger event.

7. The method of claim 6, wherein the deactivation trigger event includes one or more of authorizing a specific number of sales after a last activation, passage of some duration of time after the last activation, completion of a scheduled route by the vehicle, completion of the user's scheduled use of the vehicle, entry of the vehicle in a specific region, and distancing of the vehicle from a scheduled route.

8. The method of claim 1, wherein the virtual token includes a string identifying the user.

9. The method of claim 1, wherein the virtual token includes an encrypted string identifying the user.

10. The method of claim 1, wherein the virtual token includes an encrypted message identifying the user.

11. A non-transitory computer readable medium storing programs that, when executed by one or more modules in a payment server, cause the one or more modules to execute a fleet mobile payment method, the method comprising:
    assigning a fleet account to a company;
    assigning a vehicle card to a vehicle associated with the company for paying from the fleet account for sales made for the vehicle;
    setting a state of the vehicle card to a suspended state, wherein in the suspended state the vehicle card cannot be used for payments;
    receiving, from a mobile device, information that includes:
        a virtual token corresponding to a user of the vehicle, wherein the virtual token includes an identification of the user;
        a vehicle identification corresponding to the vehicle;
    identifying, based on the information, the vehicle card;
    activating the vehicle card by changing, based on the information, the state of the vehicle card from the suspended state to an active state, wherein in the active state the vehicle card can be used for payments from the fleet account;
    receiving, from a point of sale, sale information requesting authorization of a sale to be performed via the vehicle card; and
    authorizing payment for the sale via the vehicle card.

12. The non-transitory computer readable medium of claim 11, wherein the information further includes a reading of an odometer of the vehicle.

13. The non-transitory computer readable medium of claim 11, wherein the information further includes one or more of a an identification of a job on which the user is working, an identification information about the user, a password, a time indication, and a location indication.

14. The non-transitory computer readable medium of claim 11, wherein:
    the vehicle card is a physical vehicle card placed in the vehicle; and
    the user presents the vehicle card at the point of sale for performing the sale.

15. The non-transitory computer readable medium of claim 11, wherein the method further comprises:
    deactivating the active vehicle card by changing the state from the active state to the suspended state.

16. The non-transitory computer readable medium of claim 15, wherein the deactivating occurs upon occurrence of a deactivation trigger event.

17. The non-transitory computer readable medium of claim 16, wherein the deactivation trigger event includes one or more of authorizing a specific number of sales after a last activation, passage of some duration of time after the last activation, completion of a scheduled route by the vehicle, completion of the user's scheduled use of the vehicle, entry of the vehicle in a specific region, and distancing of the vehicle from a scheduled route.

18. The non-transitory computer readable medium of claim 11, wherein the virtual token includes a string identifying the user.

19. The non-transitory computer readable medium of claim 11, wherein the virtual token includes an encrypted string identifying the user.

20. The non-transitory computer readable medium of claim 11, wherein the virtual token includes an encrypted message identifying the user.

* * * * *